(12) United States Patent
Cai et al.

(10) Patent No.: US 10,921,161 B2
(45) Date of Patent: Feb. 16, 2021

(54) DIFFERENTIAL ANGLE SENSOR

(71) Applicant: China Automotive Systems, Inc., Wuhan (CN)

(72) Inventors: Haimian Cai, Ann Arbor, MI (US); Siqi Cheng, Madison Heights, MI (US); Changhe Huang, Novi, MI (US); Thaddeus Schroeder, Rochester Hills, MI (US); Christopher Mark Thrush, Shelby Township, MI (US)

(73) Assignee: CHINA AUTOMOTIVE SYSTEMS, INC., Wuhan (CN)

( * ) Notice: Subject to any disclaimer, the term of this patent is extended or adjusted under 35 U.S.C. 154(b) by 140 days.

(21) Appl. No.: 16/208,914

(22) Filed: Dec. 4, 2018

(65) Prior Publication Data

US 2020/0173813 A1 Jun. 4, 2020

(51) Int. Cl.
*G01D 5/245* (2006.01)

(52) U.S. Cl.
CPC .................... *G01D 5/2452* (2013.01)

(58) Field of Classification Search
CPC ........ G01D 5/142; G01D 5/145; G01D 5/147; G01D 5/244; G01D 5/245; G01D 5/2451; G01D 5/2452; G01B 7/30
See application file for complete search history.

(56) References Cited

U.S. PATENT DOCUMENTS

| | | | |
|---|---|---|---|
| 6,912,923 B2 | 7/2005 | Froehlich et al. | |
| 7,602,173 B2 | 10/2009 | Reichert | |
| 2003/0062890 A1* | 4/2003 | Tokumoto | G01L 3/104 324/207.25 |
| 2004/0015307 A1* | 1/2004 | Heisenberg | G01D 5/2451 702/72 |
| 2004/0056748 A1* | 3/2004 | Masaki | G01L 5/221 336/119 |
| 2006/0208726 A1* | 9/2006 | Mock | G01D 5/145 324/207.24 |
| 2010/0050731 A1* | 3/2010 | Granig | G01P 21/02 73/1.11 |
| 2010/0176799 A1* | 7/2010 | Ausserlechner | G01B 7/30 324/207.2 |
| 2015/0204692 A1* | 7/2015 | Wang | G01D 5/145 324/207.21 |

(Continued)

*Primary Examiner* — Patrick Assouad
*Assistant Examiner* — Demetrius R Pretlow
(74) *Attorney, Agent, or Firm* — Dickinson Wright PLLC

(57) ABSTRACT

A differential angle sensor for measuring a differential angle between an input shaft and an output shaft includes a target assembly fixed to rotate with one of the shafts and a ring magnet with equidistantly spaced magnet segments fixed to rotate with the other one of the shafts. The target assembly includes four identical targets extending about the common axis parallel and axially spaced apart from one another, and each having a plurality of wedge-shaped teeth extending radially toward the ring magnet. A first magnetic field sensor is disposed between first and second targets for measuring a first magnetic field strength therebetween. A second magnetic field sensor is disposed between third and fourth targets for measuring a second magnetic field strength. The targets are all circumferentially offset relative to one another such that the magnetic field strengths each vary with the differential angle between the shafts and differently from one-another.

16 Claims, 18 Drawing Sheets

(56) References Cited

U.S. PATENT DOCUMENTS

| | | | |
|---|---|---|---|
| 2015/0253153 A1* | 9/2015 | Smithanik | G01D 5/2013 |
| | | | 324/207.25 |
| 2015/0369636 A1* | 12/2015 | Deak | G01D 5/2497 |
| | | | 324/207.21 |
| 2016/0138983 A1* | 5/2016 | Ikeda | B62D 6/10 |
| | | | 73/862.193 |
| 2016/0214648 A1* | 7/2016 | Schoepe | G01D 5/145 |
| 2017/0219380 A1* | 8/2017 | Schaefer | G01D 5/145 |
| 2017/0292878 A1* | 10/2017 | Buckley | G01L 3/14 |
| 2017/0370961 A1* | 12/2017 | Hashimoto | G01P 1/103 |
| 2018/0154926 A1* | 6/2018 | Ohira | B62D 5/04 |
| 2018/0209819 A1* | 7/2018 | Marshall | G01D 5/145 |
| 2019/0017625 A1* | 1/2019 | Morris | F16K 31/535 |
| 2019/0242764 A1* | 8/2019 | Nicholl | G01D 5/245 |

* cited by examiner

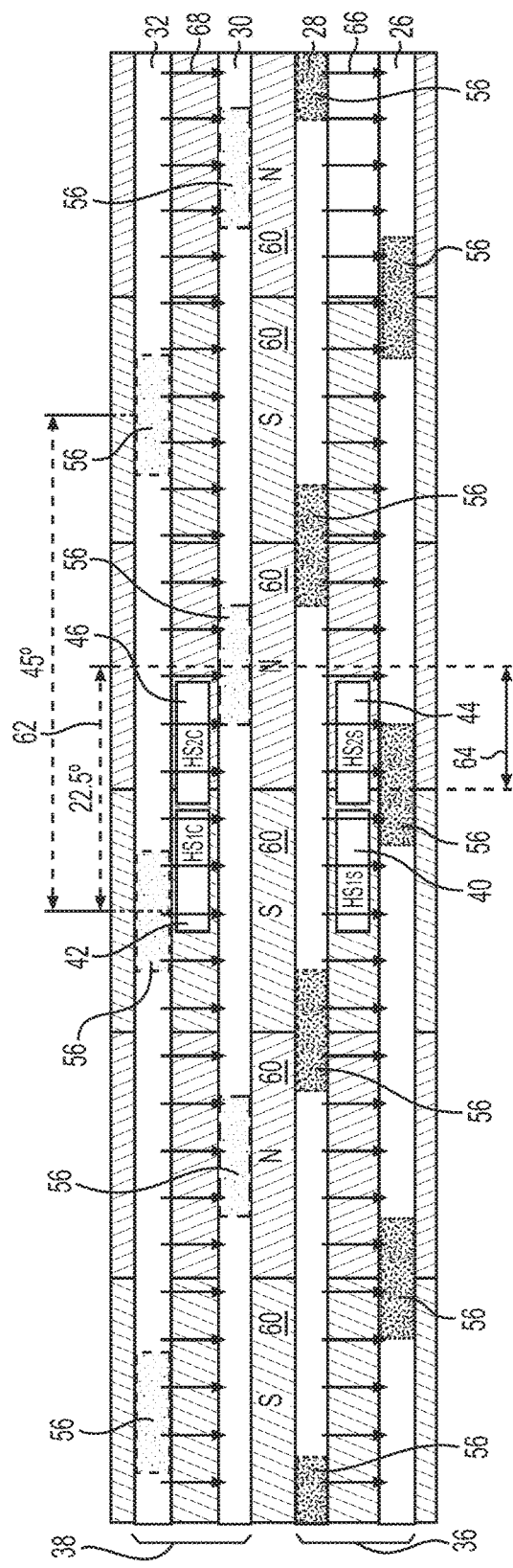
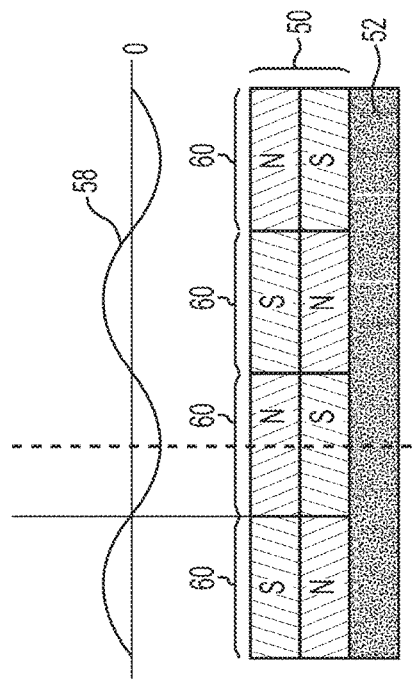
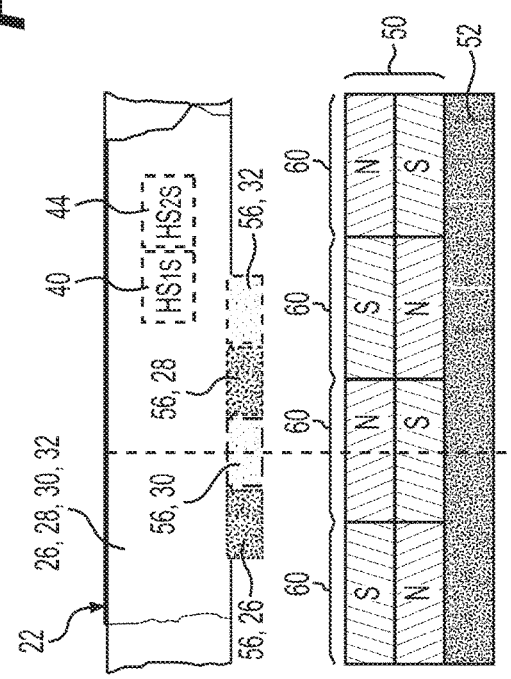
FIG. 5A
FIG. 5B
FIG. 5C

DIFFERENTIAL ANGLE SENSOR

BACKGROUND OF THE INVENTION

1. Field of the Invention

The present disclosure relates generally to sensors for measuring rotation angle. More specifically, the present disclosure relates to a sensor for measuring a differential angle as a difference between angles of two rotating members.

2. Description of the Related Art

In an Electrical Power Steering system, a steering column includes a torsion element (torsion beam) between an input shaft and output shaft. Thus, as a driver turns the steering wheel, it causes the torsion beam to twist. Differential angle sensors are often employed in power steering embodiments to detect a twist input on a torsion beam, which may also be called a "torsion bar." This information may be coupled to a power steering system, and ultimately used to operate and control a vehicle.

The ability to accurately measure the differential angle between input and output shafts is required to operate such a power steering system. The measured movement is translated to a vehicle operation.

SUMMARY OF THE INVENTION

A differential angle sensor for measuring a differential angle between an input shaft and an output shaft includes a target assembly fixed to rotate with one of the input shaft or the output shaft. The target assembly includes a first target and a second target, and a third target and a fourth target. Each of the targets include a plurality of teeth extending in a radial direction. The first and second targets extend parallel and spaced apart from one another with a first magnetic field sensor disposed therebetween for measuring a first magnetic field strength therebetween. The third and fourth targets also extend parallel and spaced apart from one another with a second magnetic field sensor disposed therebetween for measuring a second magnetic field strength therebetween. A ring magnet is fixed to rotate with the other one of the input shaft or the output shaft opposite from the shaft with the target assembly. The ring magnet includes a plurality of magnetic segments with alternating magnetic polarities equidistantly spaced by a constant first angular spacing.

In some example embodiments, the targets may surround the ring magnet and each of the teeth may extend radially inwardly toward the ring magnet. In some other embodiments, the ring magnet may surround the targets and each of the teeth may extend radially outwardly toward the ring magnet.

In one embodiment, the ring magnet is fixed to rotate with the input shaft, and the target assembly is fixed to rotate with the output shaft. In an alternative embodiment, the ring magnet is fixed to rotate with the output shaft, and the target assembly is fixed to rotate with the input shaft.

According to an aspect of the disclosure, each of the teeth of each of the first and second targets has an equal angular width, and each of the teeth of each of the first and second targets may be spaced apart by an equal angular spacing. Furthermore, the equal angular spacing between adjacent ones of the teeth on each of the first and second targets may be equal to two-times the first angular spacing between adjacent ones of the magnetic segments.

According to another aspect of the disclosure, each of the targets may be made of a solenoid quality stainless steel having a high magnetic permeability.

According to another aspect of the disclosure, each of the targets may be generally flat with a uniform thickness.

According to another aspect of the disclosure, the teeth of the third target may be circumferentially offset from the teeth of the first target by a second angular spacing equal to one-half of the first angular spacing between adjacent ones of the magnetic segments to cause the second magnetic field strength to be circumferentially shifted from the first magnetic field strength by the second angular spacing.

A method of determining a differential angle between an input shaft and an output shaft is also provided. The method includes the steps of: generating a magnetic field having a first magnetic field strength between a first target and a second target extending parallel thereto by teeth extending radially from each of the first and second targets toward a ring magnet; measuring the first magnetic field strength between the first target and the second target by a first magnetic field sensor; generating a magnetic field having a second magnetic field strength between a third target and a fourth target extending parallel thereto by teeth extending radially from each of the third and fourth targets toward the ring magnet; measuring the second magnetic field strength between the third target and the fourth target by a second magnetic field sensor; and determining the differential angle between the input shaft and the output shaft using the measured value of at least one of the first magnetic field strength and the second magnetic field strength.

According to an aspect of the disclosure, the differential angle may be determined with an accuracy of ±0.1 degrees or less across an operating range operating range of ±6.0 degrees.

The method of determining a differential angle between an input shaft and an output shaft may also include the second magnetic field strength being shifted from the first magnetic field strength by a constant angular offset. In such case, the step of determining the differential angle between the input shaft and the output shaft may include using both of the first magnetic field strength and the second magnetic field strength to determine the differential angle between the input shaft and the output shaft.

According to an aspect of the disclosure, the step of determining the differential angle between the input shaft and the output shaft, may include using a quasi-tangent including one or more predetermined ratios of the first magnetic field strength to the second magnetic field strength.

According to an aspect of the disclosure, the step of determining the differential angle between the input shaft and the output shaft may include using a look-up table with a plurality of entries each correlating a given ratio of the first magnetic field strength to the second magnetic field strength with a corresponding differential angle.

According to an aspect of the disclosure, the method of determining a differential angle between an input shaft and an output shaft may also include the step of determining a characteristic formula to correlate ratios of the of the first magnetic field strength to the second magnetic field strength with corresponding differential angles throughout an operating range, and the step of determining the differential angle between the input shaft and the output shaft may include applying the characteristic formula to calculate the differential angle.

A calibration method for calibrating a differential angle sensor is also provided. The calibration method includes rotating one of a target assembly or a ring magnet over a preset calibration range with the other one of the target assembly or the ring magnet being fixed to not rotate. The calibration method also includes acquiring data from one or more magnetic field sensors, and storing calibration data in a storage memory in the differential angle sensor to enable a sensor controller to accurately determine the differential angle between the target assembly and the ring magnet.

According to an aspect of the disclosure, the calibration method may further include performing a curve fitting to determine coefficients of a fitted equation, and where the calibration data includes the coefficients of the fitted equation.

According to another aspect of the disclosure, the calibration data may include a plurality of look-up table entries that each correlate one or more values based upon the data from the one or more magnetic field sensors with a corresponding differential angle.

According to an aspect of the disclosure, the calibration method may further include: locking a target assembly at a fixed rotational position relative to a ring magnet; and calibrating the differential angle sensor to a preset differential angle with the target assembly locked in the fixed rotational position relative to the ring magnet; and attaching each of the target assembly and the ring magnet with corresponding ones of an input shaft and an output shaft, with the target assembly locked in the fixed rotational position relative to the ring magnet; and unlocking the target assembly from the ring magnet to allow relative rotation therebetween after each of the target assembly and the ring magnet are attached to corresponding ones of an input shaft and an output shaft.

According to an aspect of the disclosure, the calibration method may further include: calibrating the differential angle sensor to a preset differential angle with the target assembly; and attaching a first one of the target assembly or the ring magnet with a corresponding one of an input shaft or an output shaft; and attaching a different one of the target assembly or the ring magnet with a corresponding one of the input shaft or the output shaft opposite the one of the input shaft or the output shaft fixed to the first one of the target assembly or the ring magnet, and with the target assembly and the ring magnet being rotationally aligned to the preset differential angle.

BRIEF DESCRIPTION OF THE DRAWINGS

Further details, features and advantages of designs of the invention result from the following description of embodiment examples in reference to the associated drawings.

FIG. 5A is an schematic view of the differential angle sensor of the present disclosure in an unrolled state;

FIG. 5B is an end view of the differential angle sensor of FIG. 5A in the unrolled state;

FIG. 5C is a composite diagram showing the ring magnet within the differential angle sensor of FIG. 5B in the unrolled state, and with a graph of the associated source magnetic field intensity produced by the ring magnet;

DETAILED DESCRIPTION OF THE ENABLING EMBODIMENTS

Figure 2:
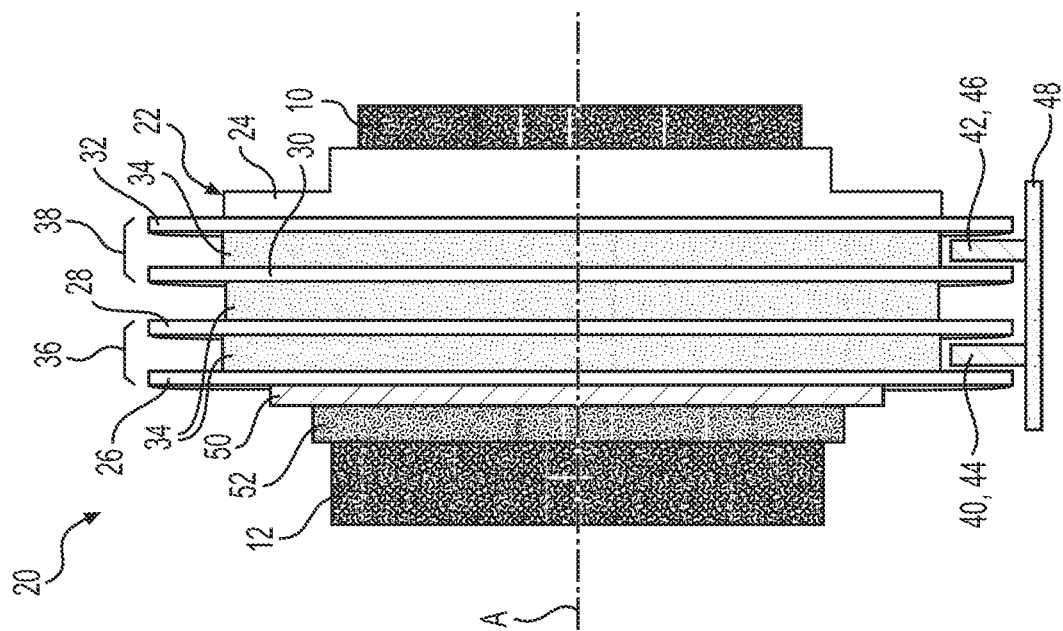
FIG. 2 is a side view of the differential angle sensor of FIG. 1.

Recurring features are marked with identical reference numerals in the Figures, in which an example embodiment of a differential angle sensor 20 for measuring a differential angle $\alpha$ between an input shaft 10 and an output shaft 12 is disclosed.

As shown in FIG. 2, the differential angle sensor 20 is disposed between an input shaft 10 and an output shaft 12, with each of the shafts 10, 12 configured to rotate about a common axis A. The differential angle sensor 20 measures a differential angle $\alpha$, which is the difference in angular rotation about the common axis A as one or both of the shafts 10, 12 are rotated thereabout.

Figure 1:
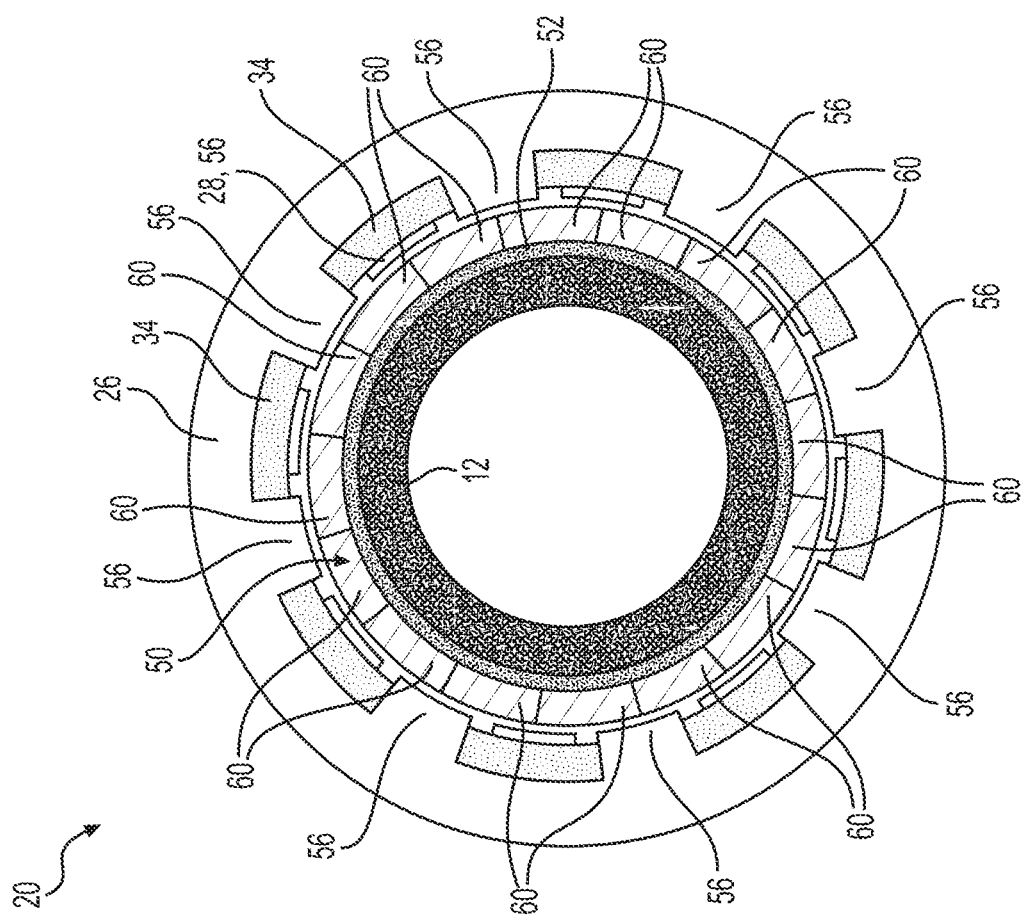
FIG. 1 is an end view of a differential angle sensor of the present disclosure.
Figure 3:
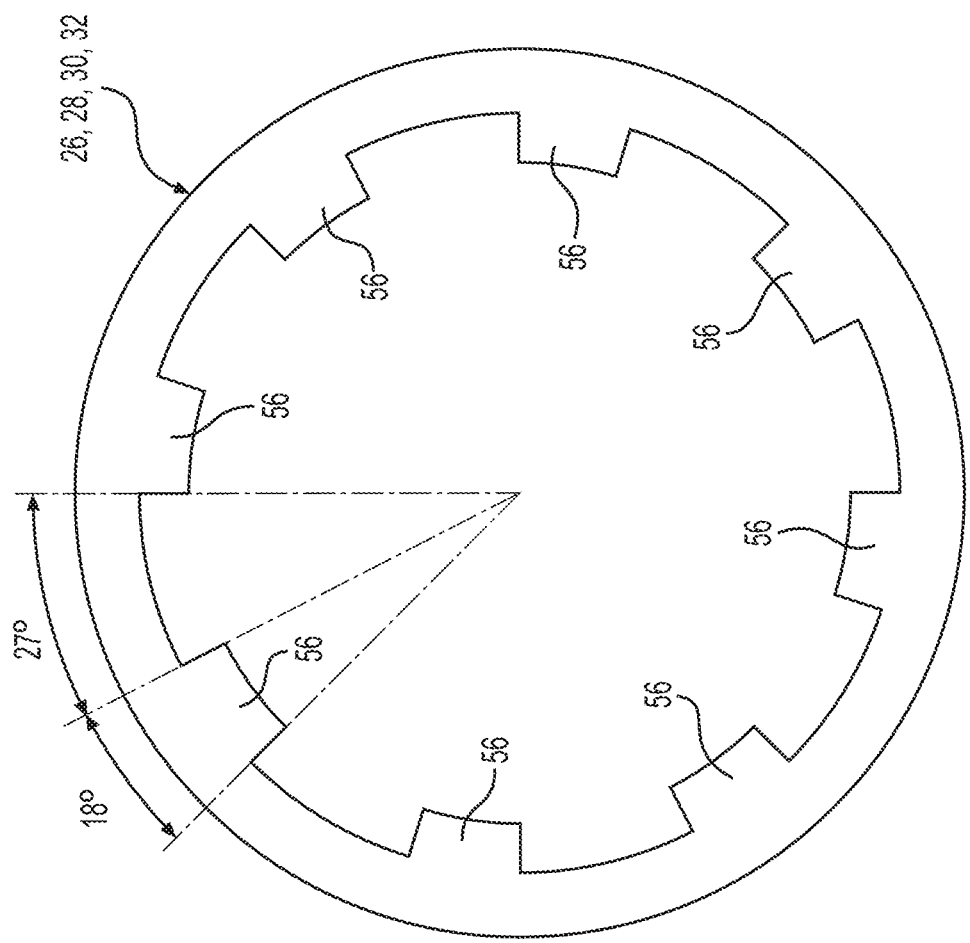
FIG. 3 is an end view of a target for the differential angle sensor of FIG. 1.

The differential angle sensor 20 includes a target assembly 22 fixed to rotate with one of the input shaft 10 or the output shaft 12. The target assembly 22 includes a target support 24 holding a first target 26 and a second target 28 and a third target 30 and a fourth target 32, on the associated one of the shafts 10, 12. Each of the targets 26, 28, 30, 32 extends annularly about the common axis A and are fixed parallel and axially spaced apart from one another by target spacers 34 of non-magnetic material, such as aluminum or plastic. As shown in FIG. 1, a first set 36 includes the first and second targets 26, 28, and a second set 38 includes the third and fourth targets 30, 32. In the example embodiment, each of the targets 26, 28, 30, 32 is identically formed, with a ring shape being generally flat with a uniform thickness and including a plurality of teeth 56, such as eight of the teeth 56, equidistantly spaced thereabout and extending radially inwardly. Each of the teeth 56 has a wedge shape with an equal angular width of 18.0 degrees and an equal angular spacing therebetween of 27.0 degrees. In other words, the teeth 56 each have the same shape and size and are regularly spaced apart from one another about the circumference of the respective one of the targets 26, 28, 30, 32.

Each of the targets 26, 28, 30, 32 is comprised of a material having a high magnetic permeability, such as electrical iron, silicon iron, ferritic stainless steel, a nickel-iron alloy, or an iron-cobalt alloy. The targets 26, 28, 30, 32 may be formed of a ferromagnetic material, such as steel or another alloy of iron. They are preferably non-corrosive. The targets 26, 28, 30, 32 may include a chemically treated and/or electroplated surface, such as a zinc layer, to inhibit corrosion. In a preferred embodiment, the targets 26, 28, 30, 32 are made of a solenoid quality stainless steel, such as Carpenter Stainless type 430F, which has both a high magnetic permeability and corrosion resistance. Each of the targets 26, 28, 30, 32 may be stamped or otherwise cut from a flat piece of material and may be inexpensively manufactured. The target assembly 22 may be constructed by molding the target spacers 34 between the targets 26, 28, 30, 32 and to secure the target support 24 thereto.

Figure 4B:
FIG. 4B is a side view of the ring magnet of FIG. 4A.
Figure 4A:
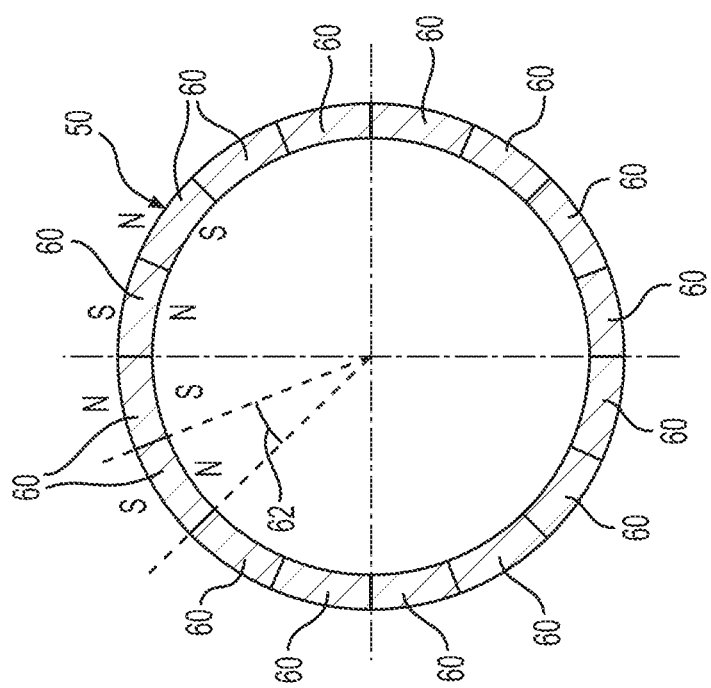
FIG. 4A is an end view of a ring magnet for the differential angle sensor of FIG. 1.

A ring magnet 50 is fixed to rotate with the other one of the input shaft 10 or the output shaft 12 different from the one of the input shaft 10 or the output shaft 12 with the target assembly 22 fixed thereto. A magnet support 52 holds the ring magnet 50 on the associated one of the shafts 10, 12. In the example embodiment shown in the FIGS, the target assembly 22 is fixed to rotate with the input shaft 10, and the ring magnet 50 is fixed to rotate with the output shaft 12. However, the subject differential angle sensor 20 would also work in a reversed configuration, with the target assembly 22 fixed to rotate with the output shaft 12 and with the ring magnet 50 fixed to rotate with the input shaft 10. An example configuration of the ring magnet 50 is shown in FIGS. 4A and 4B. The ring magnet 50 includes a plurality of magnetic segments 60 equidistantly spaced by a constant first angular spacing 62 and with alternating magnetic polarities. In the example embodiment, the ring magnet 50 includes sixteen magnetic segments 60, which results in the first angular spacing 62 being 22.5 degrees. However, the ring magnet 50 may include more or fewer magnetic segments without departing from the scope of the subject disclosure.

In an alternative embodiment, the ring magnet 50 could surround some or all of the targets 26, 28, 30, 32. In such a configuration, the teeth 56 of the targets 26, 28, 30, 32 disposed within the ring magnet 50 could extend radially outwardly toward the ring magnet 50.

The ring magnet 50 may be formed from any magnet type. However, several factors including cost, manufacturability, operating temperature range, may influence the type of material or materials used in the ring magnet 50. In a preferred embodiment, the ring magnet 50 is ferrite-based, and is formed, for example, from a moldable material that includes ferrite powder. The ring magnet 50 may alternatively be formed from sintered ferrite. Other types of magnets may also be used, such as rare-earth magnets, which may produce stronger magnetic fields, however, those types of magnets may have disadvantages such as cost and susceptibility to high temperatures that make them less advantageous. The ring magnet 50 may be magnetized by an external magnetic field from a source that is disposed outside of the ring magnet. Alternatively, the ring magnet 50 may be magnetized by a source that is entirely inside thereof. In another alternative, the ring magnet 50 may be magnetized by a source having one pole disposed inside of the ring magnet 50 and an opposite pole disposed outside of the ring magnet.

The teeth 56 on each the targets 26, 28, 30, 32 are preferably spaced-apart from one another by an angular spacing that is equal to two-times the first angular spacing 62 between adjacent ones of the magnetic segments 60. In other words, and with reference to FIG. 5A, adjacent ones of the teeth 56 on the first target 26 are spaced-apart from one another by an angular spacing of 45 degrees. Because the targets 26, 28, 30, 32 all have a similar construction, the teeth 56 on the other targets 28, 30, 32 are also equidistantly spaced apart from one-another by the same angular spacing of 45 degrees.

The differential angle sensor 20 includes a first magnetic field sensor 40 mounted to a printed circuit board 48 and disposed between the first target 26 and the second target 28 for measuring a first magnetic field strength 66 therebetween. The differential angle sensor 20 also includes a second magnetic field sensor 42 mounted to the printed circuit board 48 and disposed between the third target 30 and the fourth target 32 for measuring a second magnetic field strength 68 therebetween. As will be detailed below, the first magnetic field strength 66 between the first target 26 and the second target 28 varies with the sine of a measured angle differential $\alpha'$ between the target assembly 22 and the ring magnet 50, and the second magnetic field strength 68 between the third target 30 and the fourth target 32 varies with the cosine of the measured angle differential $\alpha'$ between the target assembly 22 and the ring magnet 50.

The first and second magnetic field sensors 40, 42 may each be hall-effect type sensors. The first magnetic field sensor 40 may be labeled "HS1S" as the primary, or $1^{st}$ hall sensor generating a Sine signal, and the second magnetic field sensor 42 may be labeled "HS1C" as the primary, or $1^{st}$ hall sensor generating a Cosine signal.

The differential angle sensor 20 also includes a third magnetic field sensor 44 mounted to the printed circuit board 48 and disposed between the first target 26 and the second target 28 for measuring the first magnetic field strength 66 therebetween. The third magnetic field sensor 44 may function as a backup for the first magnetic field sensor 40 for redundancy and/or for use in combination therewith for improved signal quality. The third magnetic field sensor 44 may be labeled "HS2S" as the secondary hall sensor generating a Sine signal. Likewise, the differential angle sensor 20 also includes a fourth magnetic field sensor 46 mounted to the printed circuit board 48 and disposed between the third target 30 and the fourth target 32 for measuring the second magnetic field strength 68 therebetween. The fourth magnetic field sensor 46 may function as a backup for the second magnetic field sensor 42 for redundancy and/or for use in combination therewith for improved signal quality. The fourth magnetic field sensor 46 may be labeled "HS2C" as the secondary hall sensor generating a Cosine signal.

In theory there can be any number of magnetic field sensors 40, 42, 44, 46 in between the corresponding targets 26, 28, 30, 32, and each of the magnetic field sensors 40, 42, 44, 46 between any two given ones of the targets 26, 28, 30, 32 should register an identical magnetic field strength 66, 68. This is due to the fact that the targets 26, 28, 30, 32 are each configured to distribute the corresponding magnetic field evenly therebetween.

As illustrated in the schematic diagram of FIG. 5A, the first and second targets 26, 28 are adjacent, parallel, and spaced-apart from one another. The teeth 56 of the first target 26 are circumferentially offset from the teeth 56 of the second target 28 by an amount equal to the first angular spacing 62 between adjacent ones of the magnetic segments 60.

As illustrated in FIG. 5C, the ring magnet 50 has a corresponding source magnetic field intensity 58 that varies sinusoidally with the circumferential position relative to the magnetic segments 60. For example, the source magnetic field intensity 58 has zero crossings that are circumferentially aligned with the boundaries between adjacent ones of the magnetic segments 60. The source magnetic field intensity 58 is at a positive or negative maximum value over the center of each corresponding one of magnetic segments 60.

In the example reference position shown in FIG. 5A, the teeth 56 of the first and second targets 26, 28 each overlie a mid-point between two adjacent ones of the magnetic segments 60 having opposite magnetic polarities. As a result, the first magnetic field strength 66 between the first and second targets 26, 28 is zero at this reference position. In other words, when the teeth 56 of the first and second targets 26, 28 are circumferentially aligned with the boundaries between the magnetic segments 60 in the position shown in FIG. 5A, the minimum source magnetic field intensity 58 is conducted from the corresponding magnetic segments 60 and through the first and second targets 26, 28 to cause the first magnetic field strength 66 to be at a corresponding zero value.

The first magnetic field strength 66 varies sinusoidally away from that zero value with an increasing differential angle α between the target assembly 22 and the ring magnet 50. More specifically, the first magnetic field strength 66=sine α', where α' is an angle differential between the target assembly 22 and the ring magnet 50 within a sensing range 72 that corresponds to one full period of the first magnetic field strength 66. The sensing range 72 is described in more detail below. The differential angle α may be determined by measuring the value of the first magnetic field strength 66 by the first magnetic field sensor 40 and by taking the arc-sine of that value to determine the angle differential α', which is multiplied by a scale factor to determine the differential angle α.

Figure 6:
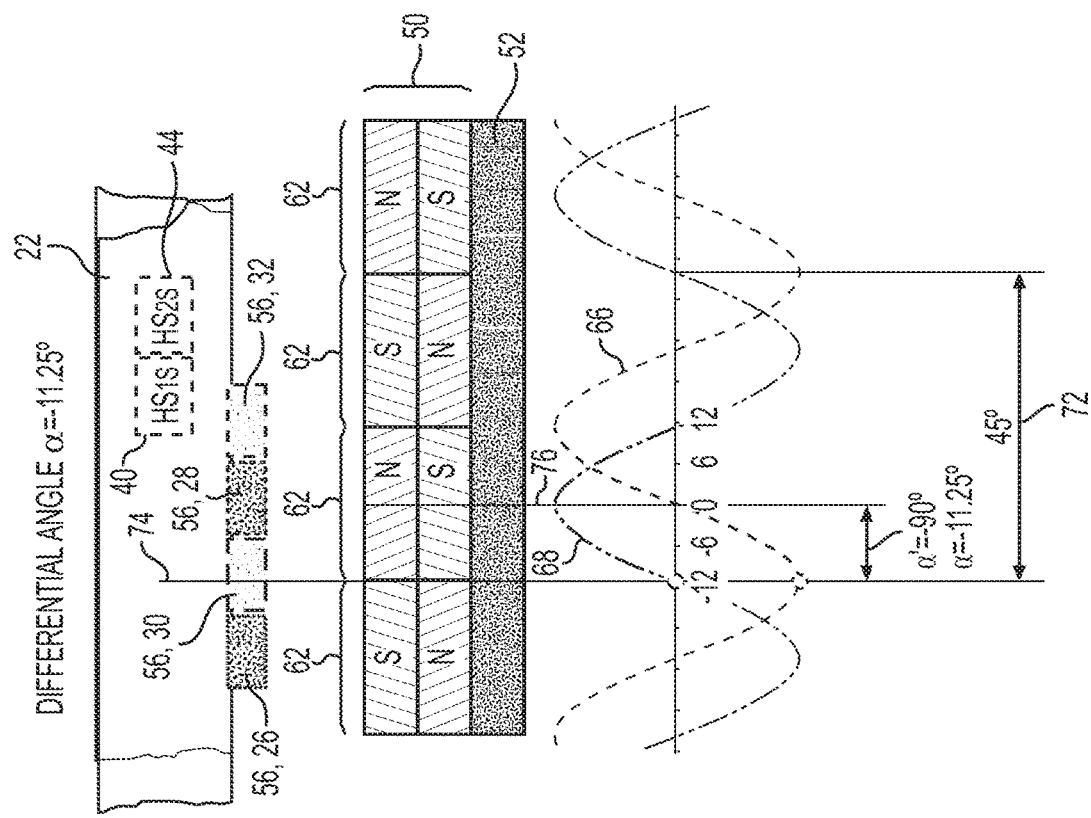
FIG. 6 is a composite diagram showing the differential angle sensor of the present disclosure with a differential angle of −11.25 degrees.
Figure 7:
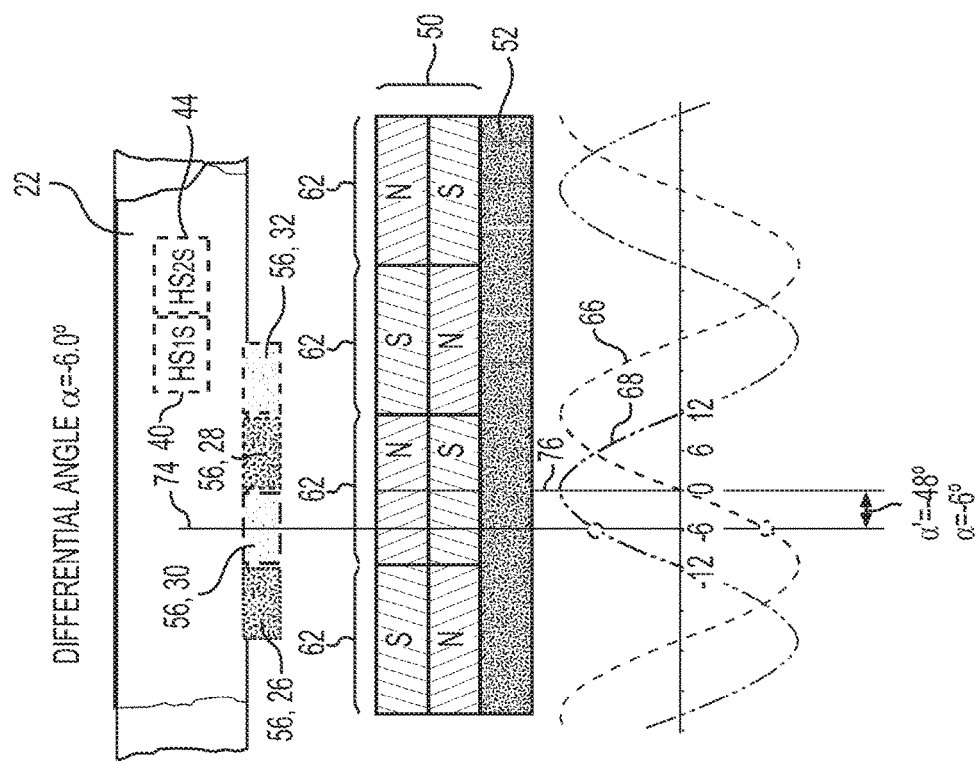
FIG. 7 is a composite diagram showing the differential angle sensor of the present disclosure with a differential angle of −6.0 degrees.
Figure 8:
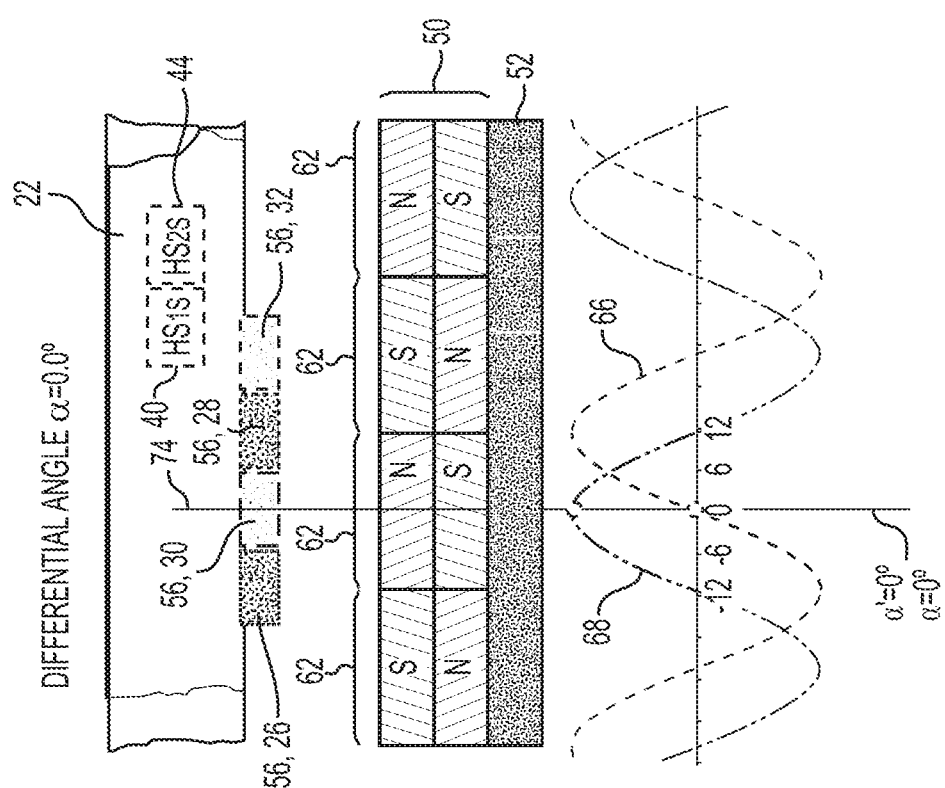
FIG. 8 is a composite diagram showing the differential angle sensor of the present disclosure with a differential angle of 0.0 degrees.

More specifically, and as illustrated on FIG. 6, the first magnetic field strength 66 is sinusoidal with a period that corresponds to the sensing range 72 of two-times the first angular spacing 62. In the example embodiment shown, the first angular spacing 62 is 22.5 degrees and the sensing range 72 is 45 degrees. The sensing range 72 may be larger or smaller, depending on the number of magnetic segments 60 in the ring magnet 50.

As also shown in FIG. 5A, the teeth 56 of the third target 30 are also circumferentially offset from the teeth of the fourth target 32 by an amount equal to the first angular spacing 62 between adjacent ones of the magnetic segments 60. The teeth 56 of the third target 30 are circumferentially offset from the teeth 56 of the first target 26 by a second angular spacing 64 equal to one-half of the first angular spacing 62 between adjacent ones of the magnetic segments 60. Therefore, the teeth 56 on each of the third and fourth targets 30, 32 are circumferentially aligned with a corresponding one of the magnetic segments 60 of the ring magnet 50, with the teeth 56 of the third target 30 being circumferentially aligned with ones of the magnetic segments 60 having a North (N) magnetic polarity and with the teeth 56 of the fourth target 32 being circumferentially aligned with ones of the magnetic segments 60 having a South (S) magnetic polarity to produce a magnetic field between the third and fourth targets 30, 32 having the first magnetic field strength 66 that varies sinusoidally with the differential angle α between the target assembly 22 and the ring magnet 50. When the teeth 56 of the third and fourth targets 30, 32 are circumferentially aligned with the magnetic segments 60 in the position shown in FIG. 5A, the corresponding second magnetic field strength 68 is at a maximum value.

The second magnetic field strength 68 varies sinusoidally away from that maximum value with an increasing differential angle α between the target assembly 22 and the ring magnet 50. More specifically, the second magnetic field strength 68=cosine α'.

By measuring values of each of the magnetic field strengths 66, 68, the differential angle α may be determined with increased accuracy when compared with measuring a single one of the magnetic field strengths 66, 68.

Figure 11:
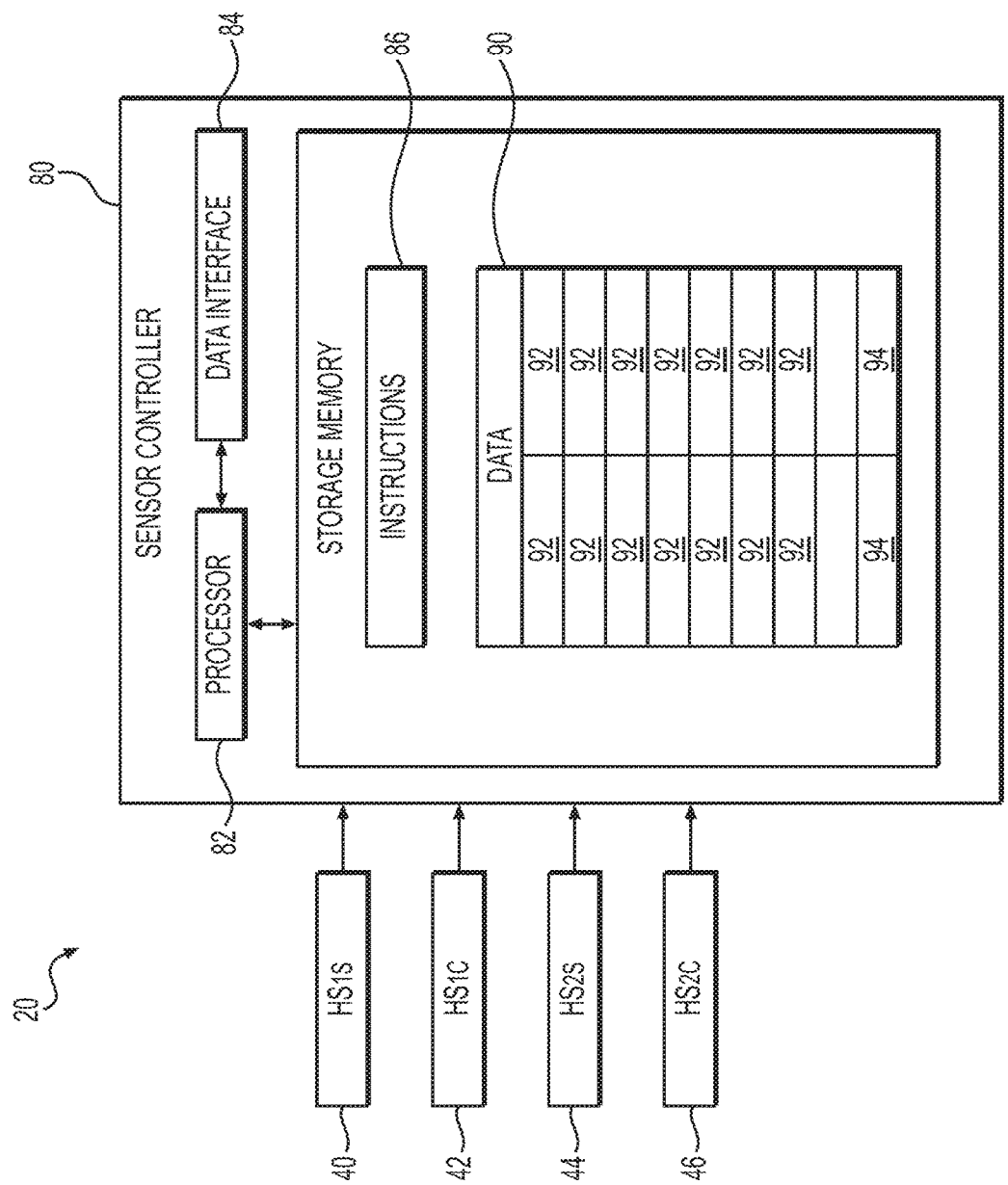
FIG. 11 is a block diagram of a differential angle sensor of the present disclosure.

FIG. 11 is a block diagram of an example embodiment of a differential angle sensor 20, and illustrates a sensor controller 80 in communication with each of the magnetic field sensors 40, 42, 44, 46 to receive signals that indicate the corresponding magnetic field strengths 66, 68. The sensor controller 80 includes a sensor processor 82 which is configured to determine the differential angle α based upon the signals from one or more of the magnetic field sensors 40, 42, 44, 46. The sensor processor 82 may be a general-purpose controller such as a microprocessor or microcontroller. Alternatively, or additionally, the sensor processor 82 may include one or more special-purpose devices, such as an application specific integrated circuit (ASIC) and/or a field programmable gate array (FPGA). The sensor processor 82 communicates the differential angle α to external devices, such as one or more vehicle system controllers, using a data interface 84. The data interface 84 may be configured to generate and to transmit one or more digital and/or analog signals that indicate the differential angle α. The sensor controller 80 also includes a machine-readable storage memory 86, for use by the sensor processor 82. The machine-readable storage memory 86 may include one or more different types of memory storage including, for example, RAM, ROM, cache, flash, optical, and/or magnetic memory. The machine-readable storage memory 86 stores instructions 88 for execution by the sensor processor 82 to cause the sensor processor 82 to perform one or more different algorithms to determine the differential angle α. The machine-readable storage memory 86 also includes a data storage 90 which may include one or more look-up table entries 92 and/or one or more fitted equation coefficients 94 for calculating the differential angle α.

Figure 12:
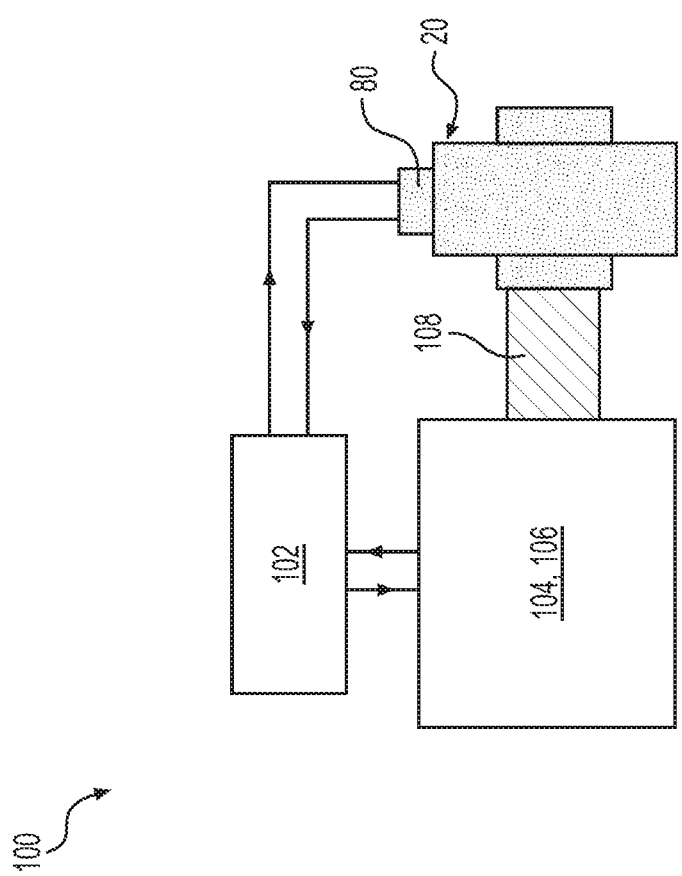
FIG. 12 is a block diagram of a calibration apparatus for calibrating the differential angle sensor of the present disclosure.

FIG. 12 shows an example embodiment of a calibration apparatus 100 for use in calibrating the differential angle sensor 20. The calibration apparatus 100 includes a calibration processor 102, which may include one or more microprocessors and/or special-purpose devices. The calibration apparatus 100 also includes a rotary actuator 104, such as a stepper motor and a rotation sensor 106, such as an angle encoder or a resolver, that are coupled to one of the input shaft 10 or the output shaft 12 with a linkage 108. In operation, the other one of the input shaft 10 or the output shaft 12 that is not coupled to the linkage 108 is locked in a fixed position.

Figure 13:
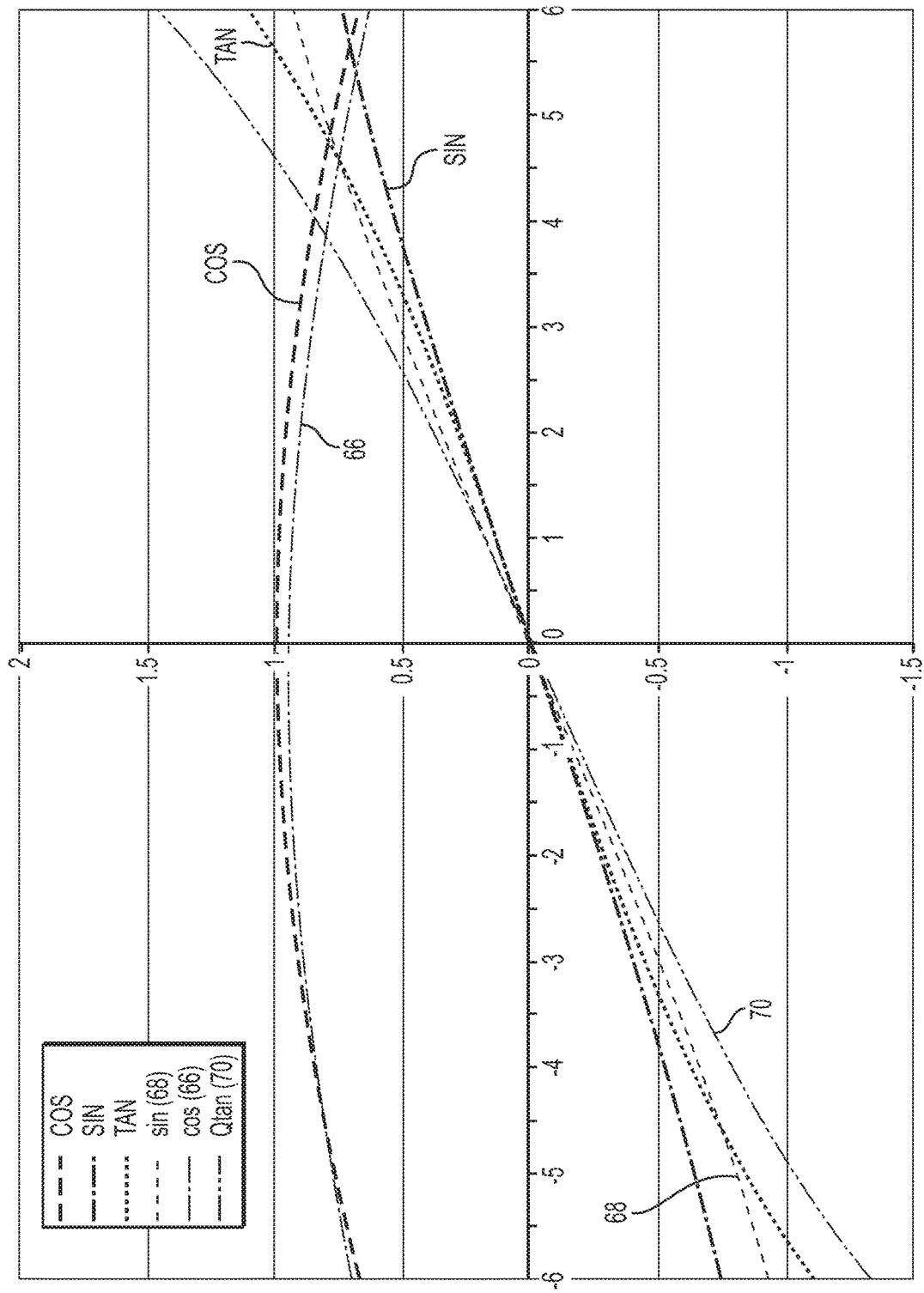
FIG. 13 is a graph showing different measured and computed values as a function of differential angle.

In practice, and due to a number of factors, the measured values of the first and second magnetic field strengths 66, 68 may differ by a small but significant amount from ideal sine (SIN) and cosine (COS) waveforms. Those differences are illustrated graphically on FIG. 13. It is well known that the tangent (TAN) of any angle θ=sine(SIN) θ divided by the cosine (COS) θ. Actual, measured values of the first and second magnetic field strengths 66, 68 through a calibration range, which is larger than the operating range, may be used to calculate a quasi-tangent 70, which may be labeled Qtan for short. For example, where the operating range is ±6.0 degrees, the calibration range may be ±12.0 degrees. The quasi-tangent 70 may be used by the sensor controller 80 to determine the differential angle α using the measured values of the first and second magnetic field strengths 66, 68. The Qtan is calculated as the first magnetic field strength 66 divided by the second magnetic field strength 68. In other words, the Qtan function is similar to the tangent (TAN) of the measured angle differential α', but uses actual, measured values of the first and second magnetic field strengths 66, 68, and therefore takes into account differences between the measured values of the first and second magnetic field strengths 66, 68 from the ideal sine (SIN) and cosine (COS) waveforms.

Figure 9:
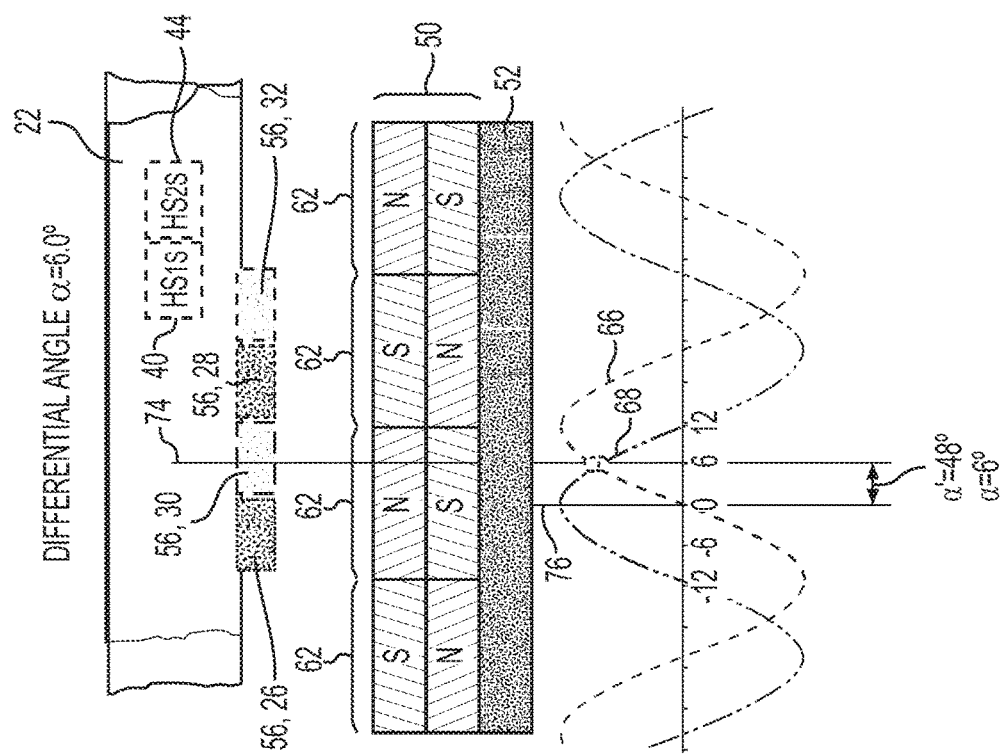
FIG. 9 is a composite diagram showing the differential angle sensor of the present disclosure with a differential angle of 6.0 degrees.
Figure 10:
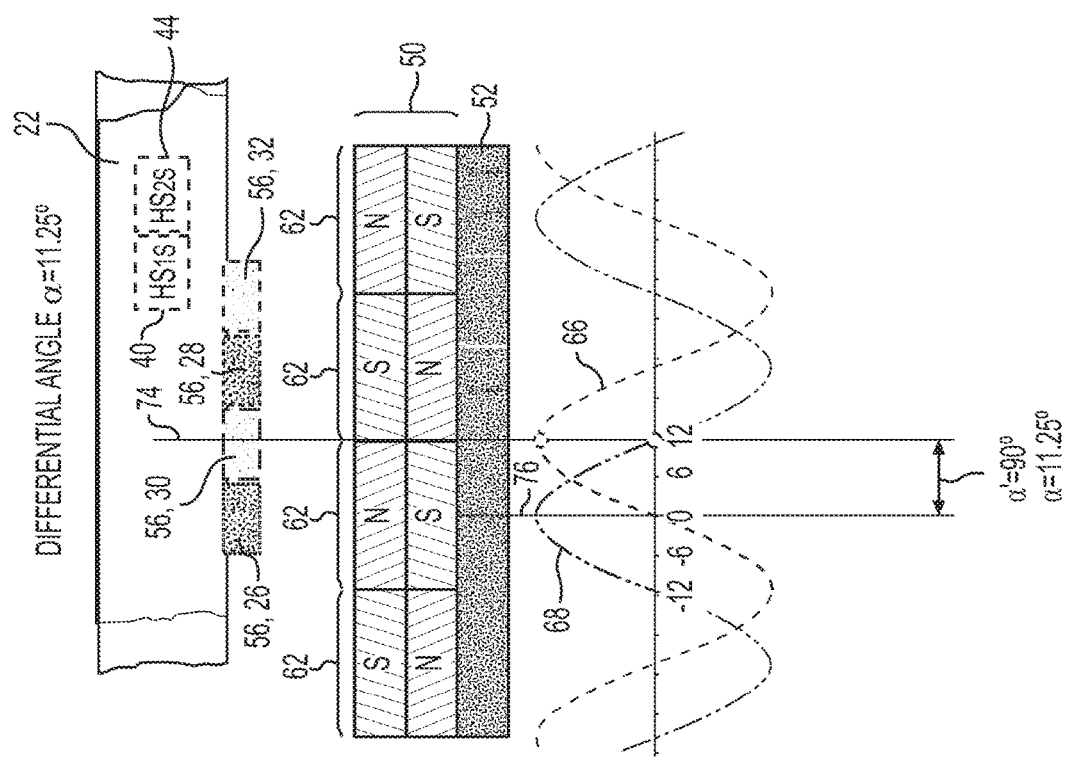
FIG. 10 is a composite diagram showing the differential angle sensor of the present disclosure with a differential angle of 11.25 degrees.
Figure 14:
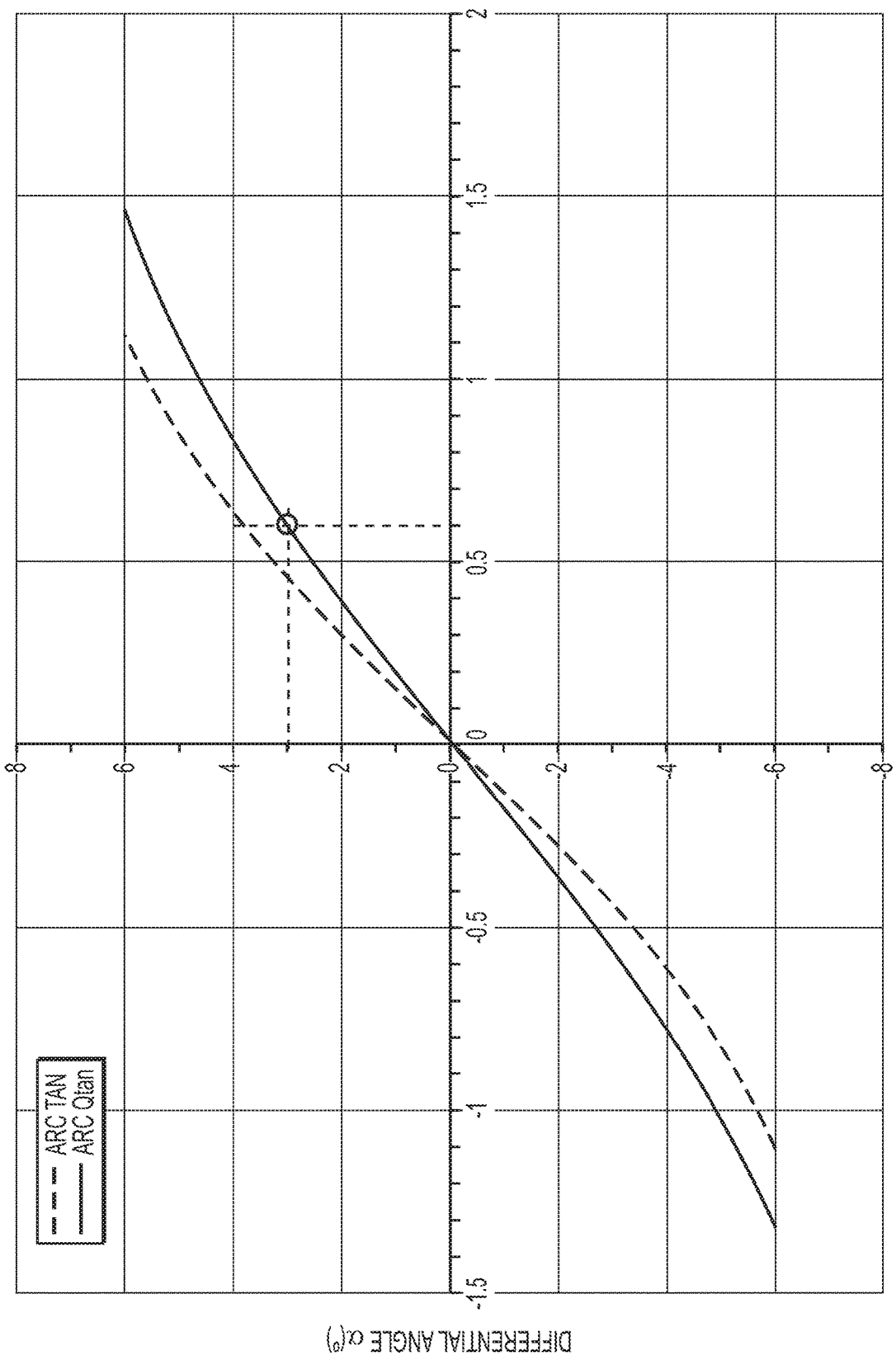
FIG. 14 is a graph showing plots for inverse tangent and inverse quasi-tangent functions to determine a computed differential angle.

Similarly, and as illustrated on FIG. 14, an inverse tangent function (ARC TAN) has an analogous inverse quasi-tangent (ARC Qtan) that can be used to determine the differential angle α from any given ARC Qtan value. In the example shown in FIG. 14, the differential angle α may be determined to be about +3.0 degrees, based upon the ARC Qtan value of 0.6. This differs significantly from the value that would be determined if the tangent (TAN) were used, which would provide a result of about +3.9 degrees. These values for the differential angle α are scaled by a scale factor of ⅛, based upon the sensing range 72 of 45 degrees, which is ⅛ of a full circle. The inverse tangent function (ARC TAN) and/or the inverse quasi-tangent (ARC Qtan) can be used to determine the measured angle differential α' that is an angular fraction of the sensing range 72 using the measured values of the first and second magnetic field strengths 66, 68. For example, as illustrated in FIG. 9, a measured angle differential α' value of 48.0 degrees would correspond to a differential angle α of 6.0 degrees, which is ⅛ of 48.0 degrees.

The differential angle sensor 20 is configured to provide a maximum accuracy across an operating range of ±6.0 degrees and may provide the differential angle α with an accuracy of ±0.1 degrees across that operating range.

The differential angle α may be determined based upon the inverse tangent or the inverse quasi-tangent using a look-up table having a plurality of entries 92. The sensor processor 82 may interpolate a value that falls between lookup table entries 92. Alternatively, the sensor processor 82 may directly calculate the differential angle α using the inverse tangent (ARC TAN) function or using a fitted equation, or a characteristic formula, having coefficients 94 that has been determined to describe the inverse quasi-tangent (ARC Qtan). An example of such a fitted equation with corresponding coefficients 94 that describes the ARC Qtan function illustrated in FIG. 14 may be, for example, $y=0.0635x^4-0.5357x^3-0.2012x^2+5.3187x+0.0023$.

Figure 15A:
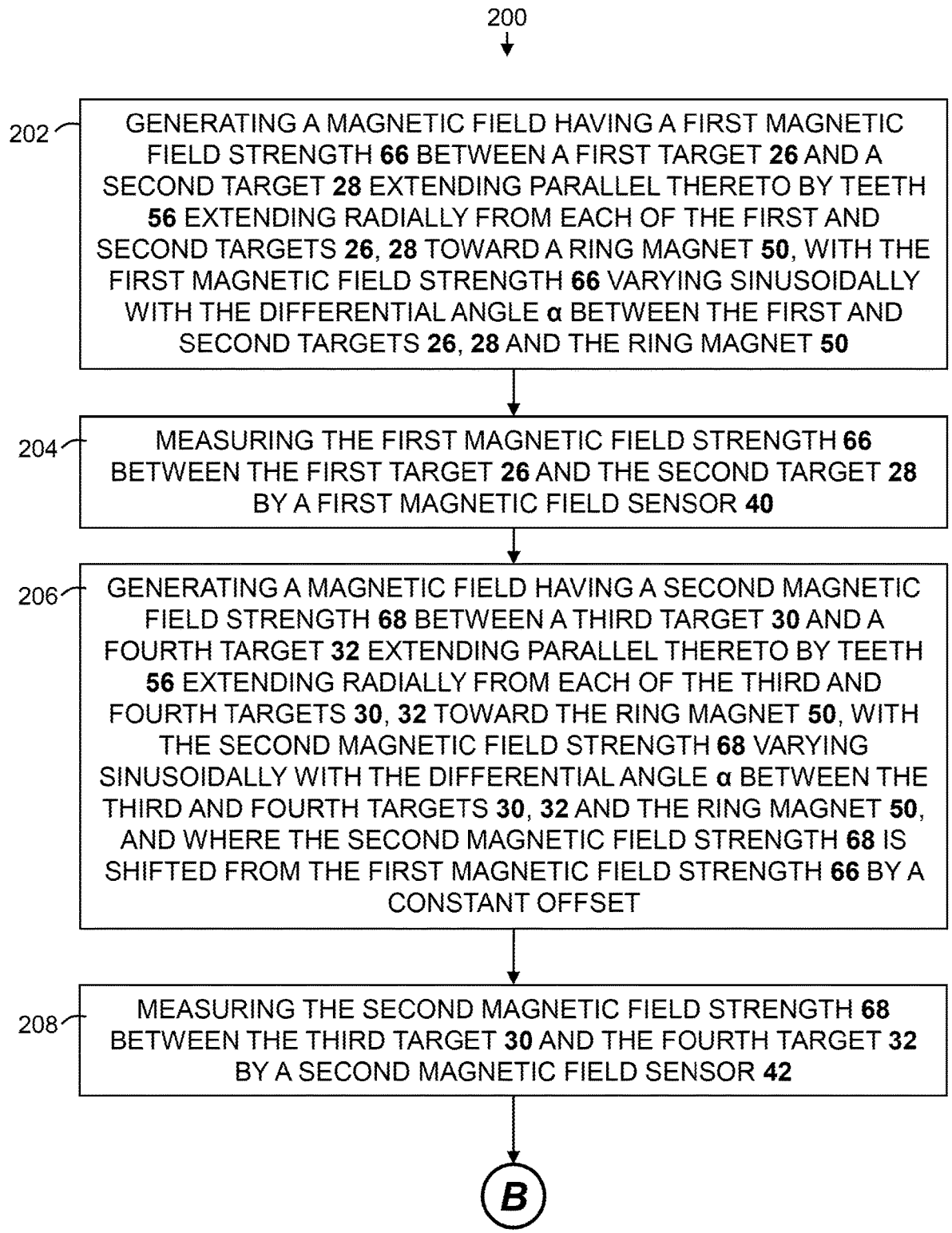
FIG. 15A is a flow chart listing steps in a method for determining a differential angle by a differential sensor of the present disclosure.
Figure 15B:
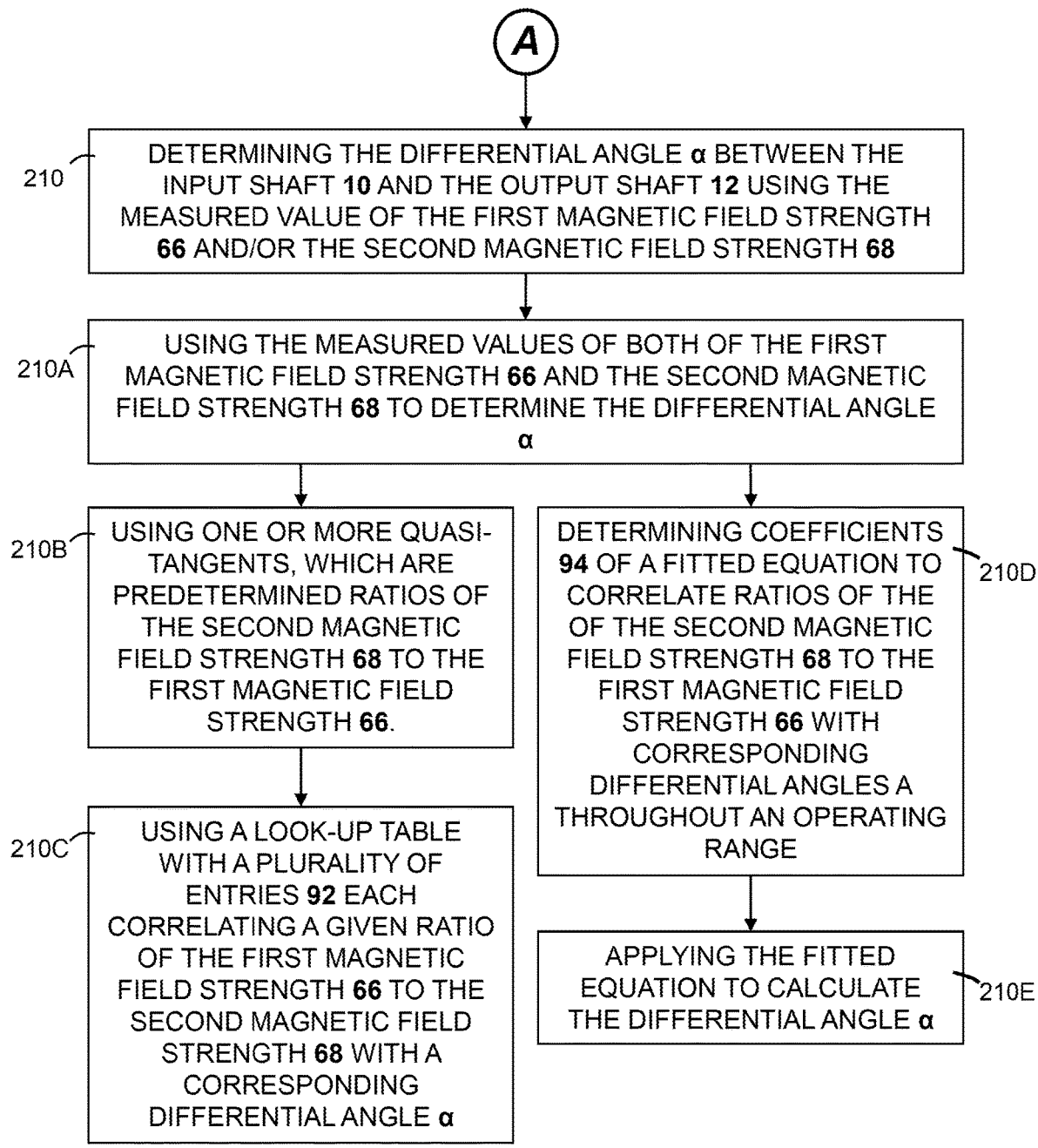
FIG. 15B is a continuation of the flow chart of FIG. 15A.

As described in the flow charts of FIGS. 15A-15B a method 200 of determining a differential angle is provided.

The method 200 includes 202 generating a magnetic field having a first magnetic field strength 66 between a first target 26 and a second target 28 extending parallel thereto by teeth 56 extending radially from each of the first and second targets 26, 28 toward a ring magnet 50, with the first magnetic field strength 66 varying sinusoidally with the differential angle α between the first and second targets 26, 28 and the ring magnet 50.

The method 200 also includes 204 measuring the first magnetic field strength 66 between the first target 26 and the second target 28 by a first magnetic field sensor 40.

The method 200 also includes 206 generating a magnetic field having a second magnetic field strength 68 between a third target 30 and a fourth target 32 extending parallel thereto by teeth 56 extending radially from each of the third and fourth targets 30, 32 toward the ring magnet 50, with the second magnetic field strength 68 varying sinusoidally with the differential angle α between the third and fourth targets 30, 32 and the ring magnet 50, and where the second magnetic field strength 68 is shifted from the first magnetic field strength 66 by a constant angular offset. In the example embodiment shown in the figures, the constant angular offset is 90 degrees.

The method 200 also includes 208 measuring the second magnetic field strength 68 between the third target 30 and the fourth target 32 by a second magnetic field sensor 42.

The method 200 also includes 210 determining the differential angle α between the input shaft 10 and the output shaft 12 using one or more measured values of the first magnetic field strength 66 and/or the second magnetic field strength 68. For example, the processor may calculate the value of the differential angle α using only the first magnetic field strength 66, where the first magnetic field strength 66 varies as the sine of a measured angle differential α'. The differential angle α is preferably determined with an accuracy of ±0.1 degrees or less across an operating range operating range of ±6.0 degrees.

More specifically, step 210 may include step 210A of using measured values of both the first magnetic field strength 66 and the second magnetic field strength 68 to determine the differential angle α between the input shaft 10 and the output shaft 12.

According to an aspect, step 210A of determining the differential angle α between the input shaft 10 and the output shaft 12 may further include 210B using one or more quasi-tangents, which are predetermined ratios of the second magnetic field strength 68 to the first magnetic field strength 66.

According to an aspect, step 210A of determining the differential angle α between the input shaft 10 and the output shaft 12 may further include 210C using a look-up table with a plurality of entries 92 each correlating a given magnetic field strength 66, 68 or a given ratio of the first magnetic field strength 66 to the second magnetic field strength 68 with a corresponding differential angle α.

According to an aspect, step 210A of determining the differential angle α between the input shaft 10 and the output shaft 12 may further include 210D determining one or more coefficients 94 of a fitted equation to correlate ratios of the of the second magnetic field strength 68 to the first magnetic field strength 66 with corresponding differential angles α throughout an operating range, and 210E applying the fitted equation to calculate the differential angle α. For example, and as illustrated in FIGS. 6-10, the magnetic field strengths 66, 68 may be rotationally offset by 90-degrees so they represent the sine and cosine of a measured angle differential α', from which the differential angle α can be determined. It should be appreciated that the magnetic field strengths 66, 68 could be rotationally offset by a value greater than or less than 90 degrees.

Figure 16:
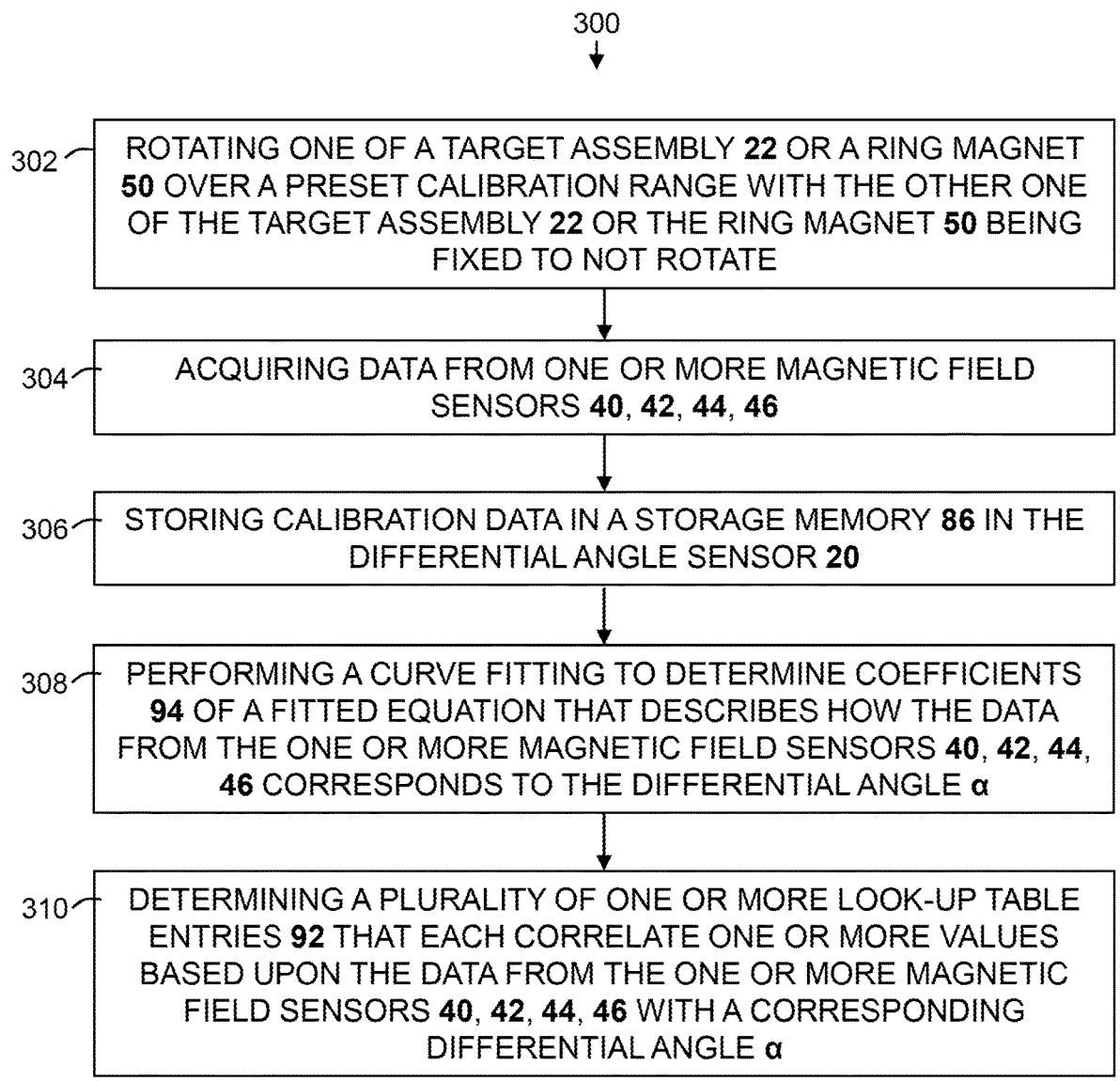
FIG. 16 is a flow chart listing steps in a calibration method for calibrating a differential angle sensor.

As described in the flow chart of FIG. 16, a calibration method 300 for calibrating a differential angle sensor 20 is also provided. The calibration method 300 includes 302 rotating one of a target assembly 22 or a ring magnet 50 over a preset calibration range of ±12.0 degrees with the other one of the target assembly 22 or the ring magnet 50 being fixed to not rotate. This is preferably performed by a rotary actuator 104, such as a stepper motor, and a rotation sensor 106, such as an angle encoder or a resolver, that are coupled to one of the target assembly 22 or the ring magnet 50 with a linkage 108, such as the example configuration shown in FIG. 12.

The calibration method 300 also includes 304 acquiring data from one or more magnetic field sensors 40, 42, 44, 46 and 306 storing calibration data in a storage memory 86 in the differential angle sensor 20 to enable a sensor controller 80 to accurately determine the differential angle α between the target assembly 22 and the ring magnet 50. The calibration data may be provided by the calibration processor 102, and/or it may be determined by the sensor processor 82 within the sensor controller 80 of the differential angle sensor 20.

These steps 304, 306 are preferably performed by a calibration processor 104 that is also configured to control the equipment used to perform step 302, described above.

The calibration processor 104 may check the magnetic field sensors 40, 42, 44, 46 associated with each set of the targets 26, 28, 30, 32 to determine the angular location of the maximum and/or zero values of each of the magnetic field strengths 66, 68. In other words, the calibration processor 104 determines a reference zero angle position having a maximum cosine value and a zero sine value. The calibration processor 104 may determine the ones of the magnetic field sensors 40, 42, 44, 46 producing the smallest angular offset between the maximum cosine and zero sine value, and use those ones of the magnetic field sensors 40, 42, 44, 46 as the primary ones of the magnetic field sensors 40, 42, 44, 46 to set the reference differential angle position α=0. The calibration processor 104 may then rotate one of the target assembly 22 or the ring magnet 50 over an operating range of ±6.0 degrees from the reference differential angle position α=0, and with the other one of the target assembly 22 or the ring magnet 50 being fixed to not rotate. While rotating the target assembly 22 or the ring magnet 50 over an operating range of ±6.0 degrees, the calibration processor 104 may record and store values of the magnetic field strengths 66, 68 measured by each of the magnetic field sensors 40, 42, 44, 46. The values of the magnetic field strengths 66, 68 measured by each of the magnetic field sensors 40, 42, 44, 46 may then be transferred to the sensor controller 80 for use as look-up table entries 92. Alternatively or additionally, combination ratios between the measured magnetic field strengths 66, 68, which may otherwise be called sine/cosine ratios or quasi-tangents, may be stored by either the calibration processor 104 or by the sensor processor 82 as the look-up table entries 92.

The calibration method 300 may also include 308 performing a curve fitting to determine coefficients 94 of a fitted equation that describes how the data from the one or more magnetic field sensors 40, 42, 44, 46 corresponds to the differential angle α. Those coefficients 94 are then used in the calibration data that is transferred to the sensor controller 80.

Alternatively or additionally, the calibration method 300 may include 310 determining a plurality of look-up table entries 92 that each correlate one or more values based upon the data from the one or more magnetic field sensors 40, 42, 44, 46 with a corresponding differential angle α. Those look-up table entries 92 are then used in the calibration data that is transferred to the sensor controller 80.

Figure 17:
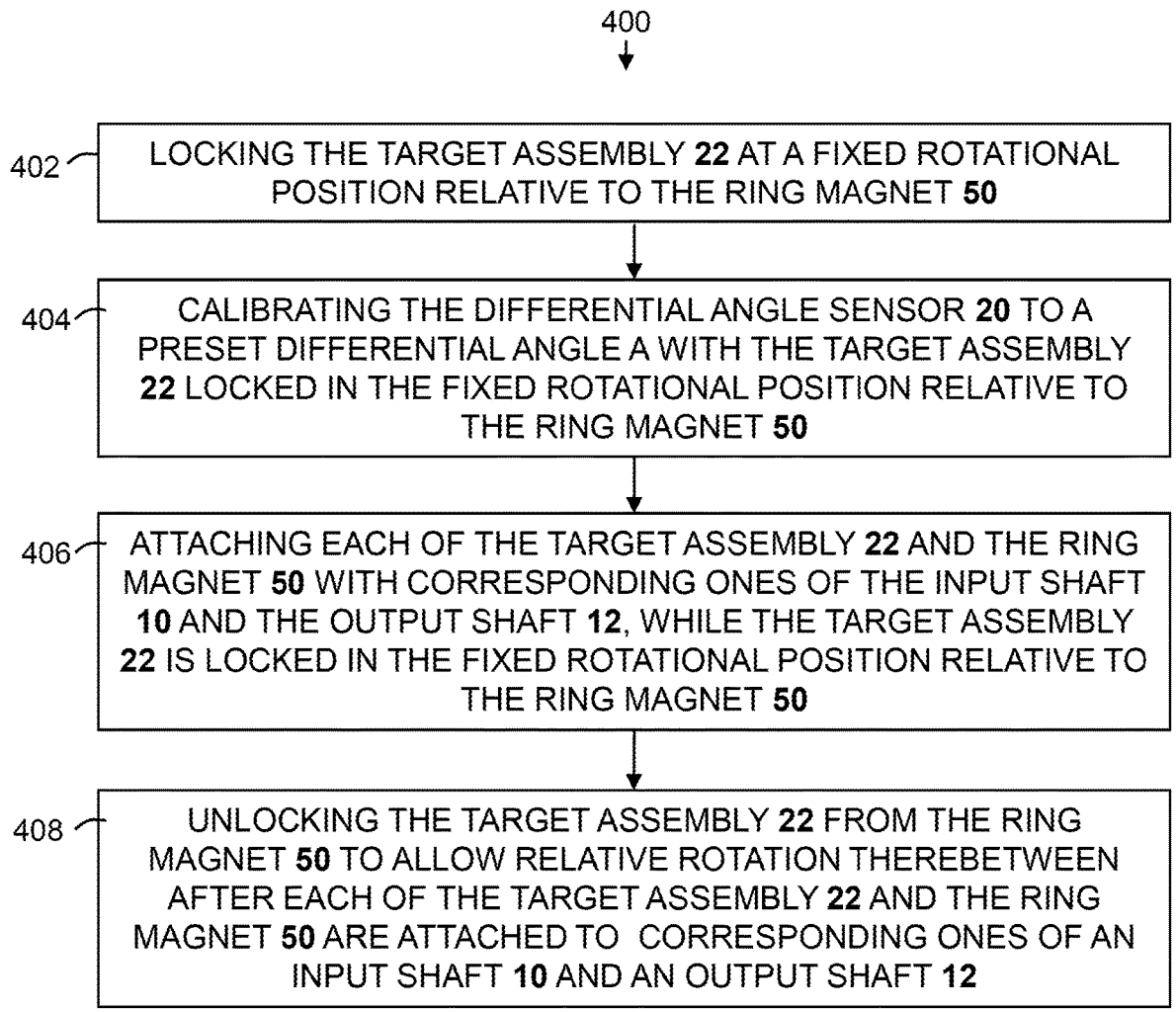
FIG. 17 is a flow chart listing steps in a first assembly method for installing the differential angle sensor while maintaining its calibration.

As described in the flow chart of FIG. 17, a first assembly method 400 for installing the differential angle sensor 20 while maintaining its calibration is also provided. The first assembly method 400 preferably includes the calibration method 300, as described above, with the following additional steps.

The first assembly method 400 includes 402 locking the target assembly 22 at a fixed rotational position relative to the ring magnet 50. This locking is preferably done with a device that is easily removable, such as a pin or a retainer clip.

The first assembly method 400 also includes 404 calibrating the differential angle sensor 20 to a preset differential angle α with the target assembly 22 locked in the fixed rotational position relative to the ring magnet 50. This step preferably includes the calibration method 300 described above.

The first assembly method 400 also includes 406 attaching each of the target assembly 22 and the ring magnet 50 with corresponding ones of the input shaft 10 and the output shaft 12, while the target assembly 22 is locked in the fixed rotational position relative to the ring magnet 50.

The first assembly method 400 also includes 408 unlocking the target assembly 22 from the ring magnet 50 to allow relative rotation therebetween after each of the target assembly 22 and the ring magnet 50 are attached to corresponding ones of an input shaft 10 and an output shaft 12. This step 408 may include removing the pin or retainer clip used in step 402, described above.

Figure 18:
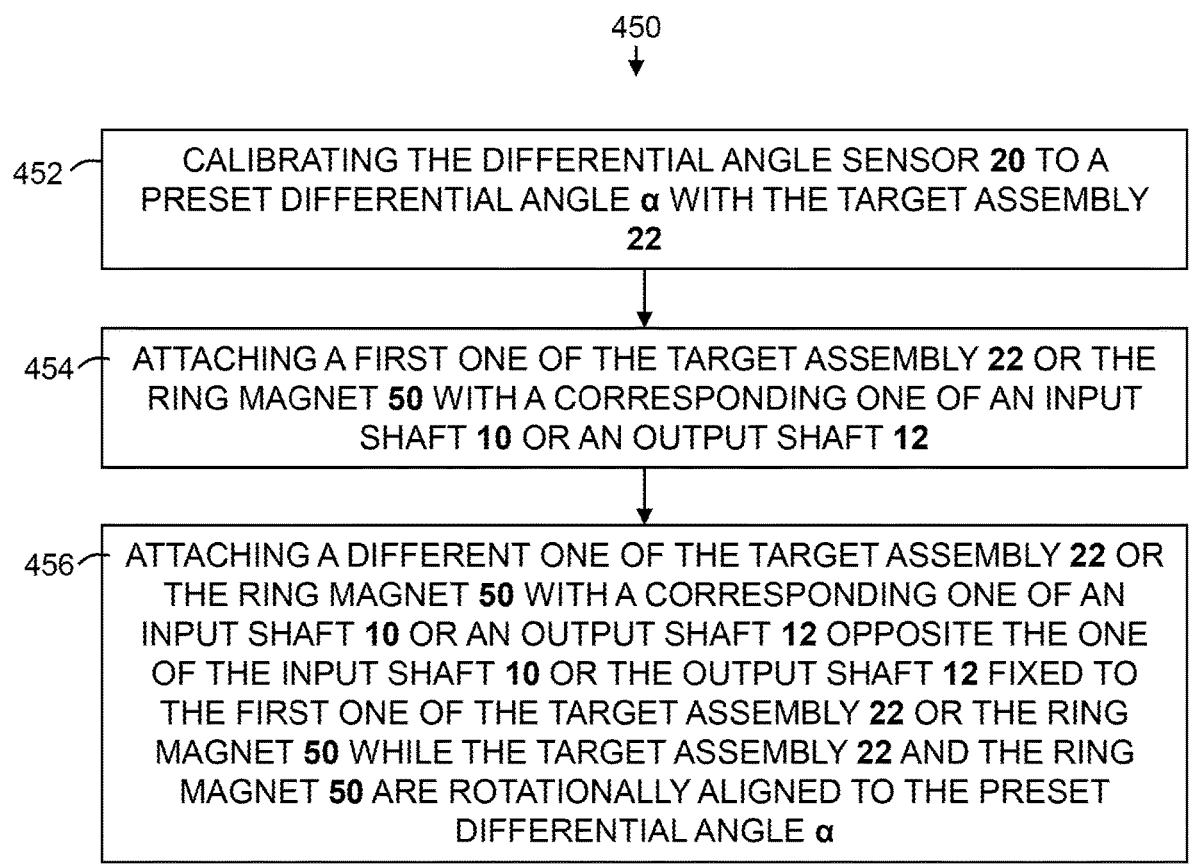
FIG. 18 is a flow chart listing steps in a second, assembly method for installing the differential angle sensor while maintaining its calibration.

As described in the flow chart of FIG. 18, a second, alternative assembly method 450 for installing the differential angle sensor 20 while maintaining its calibration is also provided. The second assembly method 450 preferably includes the calibration method 300, as described above, with the following additional steps.

The second assembly method 450 includes 452 calibrating the differential angle sensor 20 to a preset differential angle α with the target assembly 22. This step 452 may be referred to as "zeroing" the sensor 20, particularly where the preset differential angle α is a zero-degree position.

The second assembly method 450 also includes 454 attaching a first one of the target assembly 22 or the ring magnet 50 with a corresponding one of an input shaft 10 or an output shaft 12. This step may include making a permanent and/or unmovable attachment such as welding.

The second assembly method 450 also includes 456 attaching a different one of the target assembly 22 or the ring magnet 50 with a corresponding one of the input shaft 10 or the output shaft 12 opposite the one of the shafts 10, 12 that is fixed to the first one of the target assembly 22 or the ring magnet 50 while the target assembly 22 and the ring magnet 50 are rotationally aligned to the preset differential angle α. For example, the free one of the target assembly 22 or the ring magnet 50 may be adjusted or rotated until the sensor 20 is at the zero-degree position, and when the sensor 20 is at that position zero-degree position, then the free one of the target assembly 22 or the ring magnet 50 is securely fastened to its corresponding shaft 10, 12, for example by welding.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential angle sensor for measuring a differential angle between an input shaft and an output shaft comprising:
    a target assembly fixed to rotate with one of the input shaft or the output shaft and including a first target and a second target and a third target and a fourth target, with each of the targets including a plurality of teeth extending radially;
    the first target and the second target extending parallel and spaced apart from one another with a first magnetic field sensor disposed therebetween for measuring a first magnetic field strength between the first and second targets;
    the third target and the fourth target extending parallel and spaced apart from one another with a second magnetic field sensor disposed therebetween for measuring a second magnetic field strength between the third and fourth targets;
    a ring magnet fixed to rotate with the other one of the input shaft or the output shaft different from the one of the input shaft or the output shaft with the target assembly fixed thereto; and
    the ring magnet including a plurality of magnetic segments equidistantly spaced by a constant first angular spacing and having alternating magnetic polarities.

2. The differential angle sensor of claim 1, wherein each of the first target and the second target surrounds the ring magnet, and wherein each of the teeth of each of the first and second targets extends radially inwardly toward the ring magnet.

3. The differential angle sensor of claim 1, wherein the ring magnet surrounds each of the first target and the second target and wherein each of the teeth of each of the first and second targets extends radially outwardly toward the ring magnet.

4. The differential angle sensor of claim 1, wherein the ring magnet is fixed to rotate with the input shaft, and wherein the target assembly is fixed to rotate with the output shaft.

5. The differential angle sensor of claim 1, wherein the ring magnet is fixed to rotate with the output shaft, and wherein the target assembly is fixed to rotate with the input shaft.

6. The differential angle sensor of claim 1, wherein each of the teeth of each of the first and second targets has an equal angular width and an equal angular spacing therebetween; and
    wherein the equal angular spacing between adjacent ones of the teeth of each of the first and second targets is equal to two-times the constant first angular spacing between adjacent ones of the magnetic segments.

7. The differential angle sensor of claim 1, wherein each of the targets is comprised of a solenoid quality stainless steel having a high magnetic permeability.

8. The differential angle sensor of claim 1, wherein each of the targets is generally flat with a uniform thickness.

9. The differential angle sensor of claim 1, wherein the teeth of each of the third target and the fourth target are circumferentially offset from the teeth of each of the first target and the second target to cause the first magnetic field strength to be measurably different from the second magnetic field strength.

10. The differential angle sensor of claim 9, wherein the teeth of the third target are circumferentially offset from the teeth of the first target by a second angular spacing equal to one-half of the first angular spacing between adjacent ones of the magnetic segments to cause the second magnetic field strength to be circumferentially shifted by the second angular spacing from the first magnetic field strength.

11. A method of determining a differential angle between an input shaft and an output shaft comprising:
    generating a magnetic field having a first magnetic field strength between a first target and a second target extending parallel thereto by teeth extending radially from each of the first and second targets toward a ring magnet;
    measuring the first magnetic field strength between the first target and the second target by a first magnetic field sensor;
    generating a magnetic field having a second magnetic field strength between a third target and a fourth target extending parallel thereto by teeth extending radially from each of the third and fourth targets toward the ring magnet;
    measuring the second magnetic field strength between the third target and the fourth target by a second magnetic field sensor; and
    determining the differential angle between the input shaft and the output shaft using the measured value of at least one of the first magnetic field strength and the second magnetic field strength.

12. The method of claim 11, wherein the differential angle is determined with an accuracy of ±0.1 degrees or less across an operating range of ±6.0 degrees.

13. The method of claim 11, wherein the second magnetic field strength is shifted from the first magnetic field strength by a constant angular offset; and wherein the step of determining the differential angle between the input shaft and the output shaft includes using both of the first magnetic field strength and the second magnetic field strength.

14. The method of claim 13, wherein the step of determining the differential angle between the input shaft and the output shaft further includes using a quasi-tangent including one or more predetermined ratios of the first magnetic field strength to the second magnetic field strength.

15. The method of claim 13, wherein the step of determining the differential angle between the input shaft and the output shaft further includes using a look-up table with a plurality of entries each correlating a given ratio of the first magnetic field strength to the second magnetic field strength with a corresponding differential angle.

16. The method of claim 13, further comprising:
determining a characteristic formula to correlate ratios of the first magnetic field strength to the second magnetic field strength with corresponding differential angles throughout an operating range; and
wherein the step of determining the differential angle between the input shaft and the output shaft further includes applying the characteristic formula to calculate the differential angle.

* * * * *